(12) United States Patent
Sugimoto et al.

(10) Patent No.: US 8,193,276 B2
(45) Date of Patent: Jun. 5, 2012

(54) FLUOROCOPOLYMER AND WATER AND OIL PROOFING COMPOSITION, AND PROCESSES FOR THEIR PRODUCTION

(75) Inventors: Shuichiro Sugimoto, Tokyo (JP); Takao Hirono, Tokyo (JP); Eiji Morimoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/695,246

(22) Filed: Jan. 28, 2010

(65) Prior Publication Data

US 2010/0168319 A1 Jul. 1, 2010

Related U.S. Application Data

(63) Continuation of application No. PCT/JP2008/069801, filed on Oct. 30, 2008.

(30) Foreign Application Priority Data

Nov. 1, 2007 (JP) ................................. 2007-285128

(51) Int. Cl.
*C08L 27/12* (2006.01)

(52) U.S. Cl. ........ 524/544; 526/245; 526/246; 526/247; 526/249; 526/251; 526/253; 526/255; 526/318.2

(58) Field of Classification Search .................. 526/245, 526/318.2; 524/544
See application file for complete search history.

(56) References Cited

U.S. PATENT DOCUMENTS

| | | | | |
|---|---|---|---|---|
| 5,183,839 | A * | 2/1993 | Aharoni | 524/113 |
| 5,712,327 | A | 1/1998 | Chang et al. | |
| 5,919,527 | A * | 7/1999 | Fitzgerald et al. | 427/389.7 |
| 6,180,740 | B1 * | 1/2001 | Fitzgerald | 526/245 |
| 6,197,382 | B1 * | 3/2001 | Ornstein et al. | 524/544 |
| 2003/0207202 | A1 * | 11/2003 | Fujita et al. | 430/270.1 |
| 2007/0197717 | A1 * | 8/2007 | Ueda et al. | 524/544 |
| 2010/0069565 | A1 | 3/2010 | Hara et al. | |

FOREIGN PATENT DOCUMENTS

| | | |
|---|---|---|
| JP | 59-120661 | 7/1984 |
| JP | 62-299598 | 12/1987 |
| JP | 1-503072 | 10/1989 |
| JP | 5-17538 | 1/1993 |
| JP | 5-271351 | 10/1993 |
| JP | 07-228815 | 8/1995 |
| JP | 10-237133 | 9/1998 |
| JP | 2003-307848 | 10/2003 |
| JP | 2005-100421 | 10/2005 |

OTHER PUBLICATIONS

Machine translation of JP 2003-207848 A, translated on Oct. 21, 2010.*
Search Report issued Jan. 24, 2011 in Europe Application No. 08843932.8.
Database WPI Week 199214, AN 1992-111154, XP 002616471, & JP 4 055480 A, Feb. 24, 1992, 2 pages (Abstract).
Kazuhiko Hotta, et al., "Electrodeposition thermosetting coating compositions containing acrylic resins and melamine resins", Retrieved from STN, Database Accession No. 1992:450916, XP002616472, & JP 4 055480 A, Feb. 24, 1992, 1 page (Abstract).

* cited by examiner

*Primary Examiner* — Mark Eashoo
*Assistant Examiner* — Nicole M Buie-Hatcher
(74) *Attorney, Agent, or Firm* — Oblon, Spivak, McClelland, Maier & Neustadt, L.L.P.

(57) ABSTRACT

A fluorocopolymer capable of exhibiting excellent water and oil resistance even with its perfluoroalkyl group being a short chain, and a water and oil proofing composition containing it, are provided.
A water and oil proofing composition containing a fluorocopolymer (A) comprising from 40 to 98 mass % of polymerized units (a') having a $C_{1-6}$ perfluoroalkyl group, from 1 to 50 mass % of polymerized units (b') having an alkylene oxide and from 1 to 10 mass % of polymerized units (c') based on a monomer represented by $CH_2\!=\!C(COOH)\text{-}Q\text{-}COOH$ (wherein Q is a $C_{1-4}$ alkylene group, etc.).

19 Claims, No Drawings

… (US 8,193,276 B2)

FLUOROCOPOLYMER AND WATER AND OIL PROOFING COMPOSITION, AND PROCESSES FOR THEIR PRODUCTION

TECHNICAL FIELD

The present invention relates to a fluorocopolymer which is capable of imparting water and oil resistance to various articles, and a process for its production, a water and oil proofing composition containing such a fluorocopolymer and a process for its production, as well as a processed article treated with such a water and oil proofing composition.

BACKGROUND ART

A water and oil proofing agent has been proposed which contains a fluorocopolymer (crystallizable polymer) prepared by using an $R^f$ group-containing monomer which forms a homopolymer having a melting point of crystallites attributable to polyfluoroalkyl groups (hereinafter referred to as $R^f$ groups).

As such a fluorocopolymer, e.g. the following Patent Document 1 proposes a quaternary fluorocopolymer comprising polymerized units based on a perfluoroalkyl group (hereinafter referred to as an $R^F$ group)-containing acrylate, polymerized units based on stearyl (meth)acrylate, polymerized units based on 2-chloroethyl vinyl ether and polymerized units based on N-methylol (meth) acrylamide.

Further, the following Patent Document 2 proposes a quaternary fluorocopolymer comprising polymerized units based on an $R^F$ group-containing acrylate, polymerized units based on a (meth)acrylate containing an alkyl group or the like, polymerized units based on an acrylate containing a polyoxyalkylene group and polymerized units based on an acrylate containing a dialkylamino group.

Further, the following Patent Document 3 proposes a copolymer essentially comprising polymerized units based on an $R^F$ group-containing acrylate, polymerized units of an α,β-ethylenic unsaturated monomer having a carboxyl group and polymerized units of another α,β-ethylenic unsaturated monomer.

Here, most of perfluoroalkyl groups used in conventional fluorinated water and oil proofing agents have at least 8 carbon atoms. In recent years, from the viewpoint of the influence to the environment, compounds having perfluoroalkyl groups are recommended to have less than 8 carbon atoms in their perfluoroalkyl groups.

In this respect, the following Patent Document 4 discloses a fluoropolymer obtained by polymerizing a (meth)acrylate monomer containing an $R^F$ group having from 1 to 6 carbon atoms, with a nitrogen-containing monomer.

Patent Document 1: JP-A-10-237133
Patent Document 2: JP-A-5-271351
Patent Document 3: JP-A-5-17538
Patent Document 4: WO2005/100421

DISCLOSURE OF THE INVENTION

Problem that the Invention is to Solve

As the number of carbon atoms in the perfluoroalkyl group becomes small, the water and oil resistance tends to decrease, and the fluoropolymer disclosed in Patent Document 4 is not necessarily satisfactory in performance as a water and oil proofing agent.

The present invention has been made under these circumstances, and it is an object of the present invention to provide a fluorocopolymer which is capable of exhibiting excellent water and oil resistance even through its perfluoroalkyl group is a short chain, and a process for its production, a water and oil proofing composition containing such a fluorocopolymer and a process for its production, as well as a processed article treated with such a water and oil proofing composition.

Means to Solve the Problem

In order to solve the above-mentioned problem, the fluorocopolymer of the present invention comprises from 40 to 98 mass % of polymerized units (a') based on the following monomer (a), from 1 to 50 mass % of polymerized units (b') based on the following monomer (b) and from 1 to 10 mass % of polymerized units (c') based on the following monomer (c):

Monomer (a): a compound represented by $(Z—Y)_n X$, wherein Z is a $C_{1-6}$ perfluoroalkyl group or a monovalent group represented by $C_m F_{2m+1} O(CFWCF_2O)_d CFK—$ (wherein m is an integer of from 1 to 6, d is an integer of from 1 to 4, and each of W and K which are independent of each other, is a fluorine atom or a trifluoromethyl group), Y is a single bond or a bivalent organic group containing no fluorine atom, n is 1 or 2, provided that when n is 1, X is $—CR=CH_2$, $—COOCR=CH_2$, $—OCOCR=CH_2$, $—OCH_2-\phi-CR=CH_2$ or $—OCH=CH_2$, and when n is 2, X is $—CH[—(CH_2)_p CR=CH_2]—$, $—CH[—(CH_2)_p COOCR=CH_2]—$, $—CH[(CH_2)_p OCOCR=CH_2]—$ or $—OCOCH=CHCOO—$, R is a hydrogen atom, a methyl group or a halogen atom, φ is a phenylene group, p is an integer of from 0 to 4, and when n is 2, two (Z—Y) present in one molecule may be the same or different from each other;

Monomer (b): a compound represented by $CH_2=CR^1-G-(R^2O)_q—R^3$, wherein $R^1$ is a hydrogen atom or a methyl group, $R^2$ is a $C_{2-4}$ alkylene group, or a $C_{2-3}$ alkylene group having some or all of its hydrogen atoms substituted by hydroxyl groups, q is an integer of from 1 to 10, G is $—COO(CH_2)_r—$ or $—COO(CH_2)_t—NHCOO—$ (wherein r is an integer of from 0 to 4, and t is an integer of from 1 to 4), and $R^3$ is a hydrogen atom, a methyl group, an acryloyl group, a methacryloyl group or an allyl group;

Monomer (c): a compound represented by $CH_2=C(COOH)-Q-COOH$, wherein Q is a $C_{1-4}$ alkylene group, or a $C_{2-3}$ alkylene group having some or all of its hydrogen atoms substituted by hydroxyl groups, and in the monomer (c), some or all of the carboxyl groups may form at least one salt selected from an ammonium salt and an organic amine salt.

The above fluorocopolymer preferably further contains from 0.1 to 10 mass % of polymerized units (d') of the following monomer (d):

Monomer (d): a monomer which is copolymerizable with the above monomers (a), (b) and (c) and is not included in any of the monomers (a), (b) and (c) and which has at least one functional group selected from the group consisting of a carboxyl group, an isocyanate group, a blocked isocyanate group, a urethane group, an alkoxysilyl group, an epoxy group, an N-methylol group and an N-alkoxymethyl group and has no polyfluoroalkyl group.

In the above $(Z—Y)_n X$, it is preferred that Z is a $C_{1-6}$ perfluoroalkyl group, Y is a bivalent organic group containing no fluorine atom, n is 1 and X is $—OCOCR=CH_2$, or n is 2 and X is $—OCOCH=CHCOO—$ (wherein R is a hydrogen atom, a methyl group or a halogen atom).

The monomer (a) preferably is a compound represented by $F(CF_2)_s Y^1 OCOCR=CH_2$ (wherein s is an integer of from 1 to 6, R is a hydrogen atom, a methyl group or a halogen atom, and $Y^1$ is a $C_{1-10}$ alkylene group).

In $CH_2=CR^1\text{-}G\text{-}(R^2O)_q\text{---}R^3$ of the monomer (b), it is preferred that G is $\text{---}COO(CH_2)_r\text{---}$ (wherein r is an integer of from 0 to 4), $R^2$ is a $C_{2-4}$ alkylene group, q is an integer of from 1 to 10, and $R^3$ is a hydrogen atom.

The above polymerized units (b') are more preferably polymerized units based on 2-hydroxyethyl methacrylate.

The above polymerized units (c') are preferably polymerized units based on itaconic acid (some or all of carboxyl groups may form at least one salt selected from the group consisting of an ammonium salt and an organic amine salt).

The above fluorocopolymer preferably has a mass average molecular weight of from 5,000 to 100,000.

The present invention provides a water and oil proofing composition comprising the fluorocopolymer of the present invention and an aqueous medium.

The water and oil proofing composition of the present invention comprises the above fluorocopolymer and an aqueous medium, and it is preferred that the content of a volatile organic solvent in the aqueous medium is not more than 1 mass, and in the polymerized units (c'), some or all of carboxyl groups form at least one salt selected from the group consisting of an alkali metal salt, an ammonium salt and an organic amine salt.

It is more preferred that some or all of carboxyl groups in the polymerized units (c') form salts with at least one member selected from the group consisting of ammonia, diethanolamine, tris(hydroxymethyl)aminomethane and 2-amino-2-methyl-1-propanol.

Further, the present invention provides a processed article treated with the water and oil proofing composition of the present invention.

The present invention provides a process for producing a fluorocopolymer, which comprises a step of polymerizing a monomer mixture comprising from 40 to 98 mass % of the above mentioned monomer (a), from 1 to 50 mass % of the above mentioned monomer (b) and from 1 to 10 mass % of the above mentioned monomer (c).

The above mentioned monomer mixture preferably further contains from 0.1 to 10 mass % of the above mentioned monomer (d).

The present invention provides a process for producing a water and oil proofing composition, which comprises a salt-forming step of reacting the fluorocopolymer obtained by the process of the present invention with at least one member selected from the group consisting of ammonia, diethanolamine, tris(hydroxymethyl)aminomethane and 2-amino-2-methyl-1-propanol to convert some or all of carboxyl groups of the fluorocopolymer to a salt or salts, and a step of dispersing the fluorocopolymer after the salt-forming step in an aqueous medium.

Effects of the Invention

According to the present invention, it is possible to obtain a fluorocopolymer which is capable of exhibiting excellent water and oil resistance even through its perfluoroalkyl group is a short chain, and it is possible to obtain a processed article having excellent water and oil resistance, by treatment with the water and oil proofing composition of the present invention containing such a fluorocopolymer.

BEST MODE FOR CARRYING OUT THE INVENTION

In this specification, an acrylate and a methacrylate are generally represented by a (meth)acrylate. The same applies to a (meth)acryloyl group, etc.

Fluorocopolymer

The fluorocopolymer to be used in the present invention (hereinafter referred to as the fluorocopolymer (A)) comprises polymerized units (a') based on a monomer (a), polymerized units (b') based on a monomer (b) and polymerized units (c') based on a monomer (c), as essential polymerized units.

Monomer (a), Polymerized Units (a')

The monomer (a) is a compound represented by $(Z\text{---}Y)_n X$. The polymerized units (a') are polymerized units formed by cleavage of the double bond of the polymerizable unsaturated group of the monomer (a).

In $(Z\text{---}Y)_n X$, Z is an $R^F$ group having from 1 to 6 carbon atoms or a monovalent group represented by $C_m F_{2m+1}O(CFWCF_2O)_d CFK\text{---}$ (wherein m is an integer of from 1 to 6, d is an integer of from 1 to 4, and each of W and K which are independent of each other, is a fluorine atom or $\text{---}CF_3$). Z is preferably an $R^F$ group having from 1 to 6 carbon atoms, more preferably $F(CF_2)_2\text{---}$, $F(CF_2)_3\text{---}$, $F(CF_2)_4\text{---}$, $F(CF_2)_5\text{---}$, $F(CF_2)_6\text{---}$, $(CF_3)_2 CF(CF_2)_2\text{---}$ or the like. Further, Z is more preferably an $R^F$ group having from 3 to 6 carbon atoms, further preferably $F(CF_2)_4\text{---}$, $F(CF_2)_5\text{---}$, $F(CF_2)_6\text{---}$ or the like.

Y is a bivalent organic group containing no fluorine atom, or a single bond. Y is preferably a bivalent organic group containing no fluorine atom. Y is more preferably a bivalent group represented by $\text{---}R^M\text{-}T\text{-}R^N\text{---}$. In this formula, each of $R^M$ and $R^N$ which are independent of each other, is a single bond or a $C_{1-22}$ saturated or unsaturated hydrocarbon group which may contain at least one etheric oxygen atom. T is a single bond, $\text{---}OCONH\text{---}$, $\text{---}CONH\text{---}$, $\text{---}SO_2 NH\text{---}$, $\text{---}SO_2 NR'\text{---}$ (wherein R' is a $C_{1-6}$ alkyl group) or $\text{---}NHCONH\text{---}$.

The above $\text{---}R^M\text{-}T\text{-}R^N\text{---}$ for Y is preferably a $C_{1-11}$ alkylene group, $\text{---}CH=CHCH_2\text{---}$, $\text{---}(CH_2 CHR''O)_j CH_2 CH_2\text{---}$ (wherein j is an integer of from 1 to 10, and R'' is a hydrogen atom or a methyl group), $\text{---}C_2 H_4 OCONHC_2 H_4\text{---}$, $\text{---}C_2 H_4 OCOOC_2 H_4\text{---}$ or $\text{---}COOC_2 H_4\text{---}$, more preferably a $C_{1-11}$ alkylene group, further preferably $\text{---}CH_2\text{---}$, $\text{---}CH_2 CH_2\text{---}$, $\text{---}(CH_2)_{11}\text{---}$ or $\text{---}CH_2 CH_2 CH(CH_3)\text{---}$.

n is 1 or 2.

X is a polymerizable unsaturated group, and when n is 1, it is $\text{---}CR=CH_2$, $\text{---}COOCR=CH_2$, $\text{---}OCOCR=CH_2$, $\text{---}OCH_2\text{-}\phi\text{-}CR=CH_2$ or $\text{---}OCH=CH_2$, and when n is 2, it is $\text{---}CH[\text{---}(CH_2)_p CR=CH_2]\text{---}$, $\text{---}CH[\text{---}(CH_2)_p COOCR=CH_2]\text{---}$, $\text{---}CH[\text{---}(CH_2)_p OCOCR=CH_2]\text{---}$ or $\text{---}OCOCH=CHCOO\text{---}$ (wherein R is a hydrogen atom, a methyl group or a halogen atom, $\phi$ is a phenylene group, and p is an integer of from 0 to 4). When n is 2, two $(Z\text{---}Y)$ present in one molecule may be the same or different from each other.

X is preferably $\text{---}OCOCR=CH_2$ or $\text{---}OCOCH=CHCOO\text{---}$. More preferred is $\text{---}OCOCR=CH_2$ from such a viewpoint that the solubility in a solvent is excellent, or emulsion polymerization can easily be carried out. R is preferably a hydrogen atom, a halogen atom (a fluorine atom, chlorine atom or the like) or a methyl group, in view of excellent polymerizability.

The monomer (a) is preferably one wherein the above Z is a $C_{1-6}$, more preferably $C_{3-6}$, perfluoroalkyl group, the above Y is a bivalent organic group containing no fluorine atom, and n is 1 and X is $\text{---}OCOCR=CH_2$, or n is 2 and X is $\text{---}OCOCH=CHCOO\text{---}$. R is preferably a hydrogen atom, a methyl group or a halogen atom.

Particularly preferred is a compound represented by $F(CF_2)_s Y^1 OCOCR=CH_2$ (wherein s is an integer of from 1 to 6, more preferably an integer of from 3 to 6, R is a hydrogen atom, a methyl group or a halogen atom, and $Y^1$ is a $C_{1-10}$ alkylene group).

Preferred specific examples of the monomer (a) include 3,3,4,4,5,5,6,6,7,7,8,8,8-tridecafluorooctyl methacrylate, 3,3,4,4,5,5,6,6,7,7,8,8,8-tridecafluorooctyl acrylate, and 3,3,4,4,5,5,6,6,6-nonafluorohexyl methacrylate.

As the monomer (a), one type may be used alone, or two or more types may be used in combination.

Monomer (b), Polymerized Units (b')

The monomer (b) is a compound represented by $CH_2=CR^1-G-(R^2O)_q-R^3$. The polymerized units (b') are polymerized units formed by cleavage of an ethylenic double bond of the monomer (b).

$R^1$ is a hydrogen atom or a methyl group, $R^2$ is a $C_{2-4}$ alkylene group, or a $C_{2-3}$ alkylene group having some or all of its hydrogen atoms substituted by hydroxyl groups, and $R^3$ is a hydrogen atom, a methyl group, a (meth)acryloyl group or an allyl group.

Two or more alkylene groups different in the number of carbon atoms may be contained in one molecule.

In the monomer (b), when two or more alkylene groups different in the number of carbon atoms are contained as $-(R^2O)_q-$, the arrangement of such repeating units may be in a block or random form. q is an integer of from 1 to 10, preferably from 1 to 9, more preferably from 1 to 4.

G is $-COO(CH_2)_r-$ or $-COO(CH_2)_t-NHCOO-$ (wherein r is an integer of from 0 to 4, and t is an integer of from 1 to 4).

As the monomer (b), one type may be used alone or two or more types may be used in combination.

$R^3$ is preferably a hydrogen atom or a (meth)acryloyl group, more preferably a hydrogen atom. $R^2$ is preferably a $C_{2-4}$ alkylene group, and G is preferably $-COO(CH_2)_r-$ (wherein r is an integer of from 0 to 4). When $R^3$ is a (meth)acryloyl group, the fluorocopolymer tends to take a three dimensional network structure, and the fluorocopolymer firmly adheres to the substrate to provide excellent durability. As the monomer (b), a compound wherein $R^3$ is a (meth) acryloyl group, and a compound wherein $R^3$ is a hydrogen atom, may be used in combination.

Preferred as the monomer (b) is, for example, 2-hydroxyethyl(meth)acrylate, 2-hydroxypropyl (meth)acrylate, 2-hydroxybutyl(meth)acrylate, 4-hydroxybutyl(meth)acrylate, polyoxyethylene glycol mono(meth)acrylate, polyoxypropylene glycol mono(meth)acrylate, methoxypolyoxyethylene glycol (meth)acrylate, trioxyethylene glycol di(meth)acrylate, tetraoxyethylene glycol di(meth)acrylate, polyoxyethylene glycol di(meth)acrylate, acryloyloxypolyoxyethylene glycol methacrylate, 2-hydroxy-3-acryloyloxypropyl (meth) acrylate, poly(oxypropylene-oxybutylene)glycol di(meth) acrylate, poly(oxyethylene-oxypropylene)glycol di(meth) acrylate or poly(oxyethylene-oxybutylene)glycol di(meth) acrylate.

Among them, 2-hydroxyethyl methacrylate (HEMA) is particularly preferred. When a plurality of them are used in combination, from the viewpoint of the polymerizability and polymerization stability, it is particularly preferred to use 2-hydroxyethyl methacrylate (HEMA) and triethylene glycol dimethacrylate (TEDMA) in combination.

Monomer (c), Polymerized Units (c')

The monomer (c) is a compound represented by $CH_2=C(COOH)-Q-COOH$. The polymerized units (c') are polymerized units formed by cleavage of an ethylenic double bond of the monomer (c).

In the formula, Q is a $C_{1-4}$ alkylene group, or a $C_{2-3}$ alkylene group having some or all of its hydrogen atoms substituted by hydroxyl groups.

The monomer (c) is preferably $CH_2=C(COOH)-CH_2-COOH$ (itaconic acid) or $CH_2=C(COOH)-CH_2CH_2-COOH$, more preferably itaconic acid.

One type of the monomer (c) may be used alone or two or more types thereof may be used in combination.

In the polymerized units (c'), some or all of the carboxyl groups may form at least one salt selected from the group consisting of an ammonium salt and an organic amine salt. It is preferred that by the formation of such a salt, the dispersibility of the fluorocopolymer (A) in the aqueous medium will be improved. In order to obtain such an effect, it is preferred that at least 80 mol % of carboxyl groups in the polymerized units (c') are in the form of a salt, and more preferably all of them are in the form of a salt. Such a salt may be formed by reacting the carboxyl groups with a base.

As the base to be used for forming an ammonium salt, ammonia is preferred.

The base (organic amine) to be used for forming an organic amine salt may, for example, be a monoalkylamine, dialkylamine or trialkylamine having a $C_{1-4}$ alkyl group; a monoalkanolamine, dialkanolamine or trialkanolamine having a $C_{1-4}$ alkanol group having hydrogen in the alkyl group substituted by a hydroxyl group; or amino acid. Specifically, one preferred from the viewpoint of safety and availability may, for example, be triethylamine, ethanolamine, diethanolamine, triethanolamine, 2-amino-2-methyl-1-propanol, 2-amino-2-methyl-1,3-propanediol, 2-amino-2-hydroxymethyl-1,3-propanediol, bis(hydroxymethyl)methylaminomethane, tris (hydroxymethyl)aminomethane, lysine or arginine. Among them, diethanolamine, 2-amino-2-methyl-1-proparnol or tris (hydroxymethyl)aminomethane is more preferred.

It is particularly preferred that some or all of carboxyl groups in the polymerizable units (c') form a salt with at least one member selected from the group consisting of ammonia, diethanolamine, tris(hydroxymethyl)aminomethane and 2-amino-2-methyl-1-propanol.

Such a salt may be formed at the time of dispersing the fluorocopolymer (A) in the aqueous medium, and the timing to form the salt is not particularly limited. For example, as the monomer (c), one wherein some or all of carboxyl groups form a salt, may be used, so that such a salt is maintained even after the copolymerization, or a salt may be formed after copolymerizing the monomer (c). Otherwise, both of such methods may be used in combination. From the viewpoint of the production efficiency, it is preferred to form a salt after copolymerizing the monomer (c).

Monomer (d), Polymerized Units (d')

The fluorocopolymer (A) preferably further contains polymerized units (d') based on the following monomer (d).

The monomer (d) is a monomer copolymerizable with the above monomers (a), (b) and (c) and is a monomer having at least one functional group selected from the group consisting of a carboxyl group, an isocyanate group, a blocked isocyanate group, a urethane bond, an alkoxysilyl group, an epoxy group, an N-methylol group and an N-alkoxymethyl group and having no polyfluoroalkyl group.

A monomer included in the monomer (a), (b) or (c), is not included in the monomer (d).

The polymerized units (d') are polymerized units formed by cleavage of a polymerizable double bond of the monomer (d).

As the monomer (d), the following compounds may be mentioned as preferred.

A compound having a carboxyl group:
acrylic acid, methacrylic acid, maleic acid or fumaric acid.
A compound having an isocyanate group:
2-isocyanate ethyl(meth)acrylate, 3-isocyanate propyl (meth)acrylate or 4-isocyanate butyl(meth)acrylate.

A compound having a blocked isocyanate group:
2-butanone oxime adduct of 2-isocyanate ethyl (meth)acrylate, a pyrazole adduct of 2-isocyanate ethyl (meth)acrylate, a 3,5-dimethylpyrazole adduct of 2-isocyanate ethyl (meth)acrylate, a 3-methylpyrazole adduct of 2-isocyanate ethyl(meth)acrylate, an ε-caprolactam adduct of 2-isocyanate ethyl(meth)acrylate, a 2-butanone oxime adduct of 3-isocyanate propyl (meth)acrylate, a pyrazole adduct of 3-isocyanate propyl (meth)acrylate, a 3,5-dimethylpyrazole adduct of 3-isocyanate propyl(meth)acrylate, a 3-methylpyrazole adduct of 3-isocyanate propyl(meth)acrylate, an ε-caprolactam adduct of 3-isocyanate propyl(meth)acrylate, a 2-butanone oxime adduct of 4-isocyanate butyl (meth)acrylate, a pyrazole adduct of 4-isocyanate butyl (meth)acrylate, a 3,5-dimethylpyrazole adduct of 4-isocyanate butyl(meth)acrylate, a 3-methylpyrazole adduct of 4-isocyanate butyl(meth)acrylate, or an ε-caprolactam adduct of 4-isocyanate butyl (meth)acrylate.

A compound having an urethane bond:
Triallyl isocyanurate, a tolylene diisocyanate adduct of 3-phenoxy-2-hydroxypropyl acrylate, a hexamethylene diisocyanate adduct of 3-phenoxy-2-hydroxypropyl acrylate, or a hexamethylene diisocyanate adduct of pentaerythritol triacrylate.

An alkoxysilyl compound:
A compound represented by $CH_2=CR^5D-E-SiR^aR^bR^c$ (wherein D is —OCO—, —COO— or a single bond, E is a $C_{1-4}$ alkylene group, each of $R^a$, $R^b$ and $R^c$ which are independent of one another, is a $C_{1-6}$ alkyl group or a $C_{1-6}$ alkoxy group, and $R^5$ is a hydrogen atom or a methyl group). Specifically, 3-methacryloyloxypropyltrimethoxysilane, 3-methacryloyloxypropyldimethoxymethylsilane, 3-methacryloyloxypropyltriethoxysilane, 3-methacryloyloxypropyldiethoxyethylsilane or vinyltrimethoxysilane may, for example, be mentioned.

A compound having an epoxy group:
Glycidyl(meth)acrylate, or polyoxyalkylene glycol monoglycidyl ether (meth)acrylate.

A compound having an N-methylol group or an N-alkoxymethyl group:
N-methylol (meth)acrylamide, N-methoxymethyl (meth)acrylamide, N-ethoxymethyl(meth)acrylamide or N-butoxymethyl (meth) acrylamide.

As the monomer (d), two or more different types may be used in combination. When the fluorocopolymer (A) contains polymerized units (d') based on the monomer (d), it will be excellent in durability against washing or abrasion and excellent in water repellency. Particularly with a view to satisfying both the water and oil resistance and the latex stability, it is preferred to use a compound having a carboxyl group as the monomer (d), and acrylic acid or methacrylic acid is particularly preferred.

Another Monomer

In the present invention, the fluorocopolymer (A) may further contain polymerized units based on a monomer (which may be referred to also as another monomer) other than the above monomers (a), (b), (c) and (d), which is copolymerizable with the monomers (a), (b) and (c), from the viewpoint of the adhesion of the fluorocopolymer (A) to the substrate or the cost.

As such another monomer, preferred may, for example, be ethylene, vinylidene chloride, vinyl chloride, vinylidene fluoride, vinyl acetate, vinyl propionate, vinyl isobutanoate, vinyl isodecanoate, vinyl stearate, cetyl vinyl ether, dodecyl vinyl ether, isobutyl vinyl ether, ethyl vinyl ether, 2-chloroethyl vinyl ether, styrene, α-methylstyrene, p-methylstyrene, (meth)acrylamide, N,N-dimethyl(meth)acrylamide, diacetone (meth) acrylamide, methylol-modified diacetone (meth)acrylamide, vinyl alkyl ketone, butadiene, isoprene, chloroprene, benzyl(meth)acrylate, a (meth)acrylate having a polysiloxane, ally acetate, N-vinyl carbazole, maleimide or N-methylmaleimide.

As another monomer, vinyl chloride, vinyl acetate, vinylidene chloride or butadiene is further preferred, and the water and oil proofing composition is expected to increase the barrier property by improvement of the film-forming property.

The fluorocopolymer (A) is preferably a fluorocopolymer (A) polymerized by using at least one member selected from 3,3,4,4,5,5,6,6,7,7,8,8-tridecafluorooctyl methacrylate and 3,3,4,4,5,5,6,6,6-nonafluorohexyl methacrylate, as the monomer (a), at least one member selected from dioxyethylene glycol mono(meth)acrylate, 2-hydroxyethyl(meth)acrylate, 2-hydroxypropyl(meth)acrylate, triethylene glycol di(meth)acrylate and tetraethylene glycol di(meth)acrylate, as the monomer (b) and at least one member selected from itaconic acid (which may form the above mentioned salt) as the monomer (c).

The fluorocopolymer (A) comprises from 40 to 98 mass % of polymerized units (a') based on the monomer (a), from 1 to 50 mass % of polymerized units (b') based on the monomer (b) and from 1 to 10 mass % of polymerized units (c') based on the monomer (c).

More preferred ranges of the contents of the respective polymerized units are from 60 to 84 mass % of polymerized units (a'), from 5 to 34 mass % of polymerized units (b') and from 2 to 6 mass % of polymerized units (c').

The proportion of polymerized units based on another monomer in the fluorocopolymer (A) is preferably at most 30 mass %, more preferably at most 15 mass.

Within the above ranges, a processed article such as paper, nonwoven fabric, a carpet, a synthetic/artificial leather or natural leather product, or a fiber, treated with the fluorocopolymer (A), will be excellent in oil resistance, water resistance and alcohol resistance.

In a case where the fluorocopolymer (A) contains polymerized units (d') based on the monomer (d), the content of the polymerized units (d') is within a range of from 0.1 to 10 mass %.

If the content of the polymerized units (d') is less than 0.1 mass, no adequate effect of the addition will be obtained, and if it exceeds 10 mass, such is undesirable from the viewpoint of the oil resistance.

In such a case, preferred ranges of the respective contents of polymerized units (a') to (c') are from 40 to 97.9 mass % of polymerized units (a'), from 1 to 50 mass % of polymerized units (b') and from 1 to 10 mass % of polymerized units (c'). More preferred ranges are from 70 to 90 mass % of polymerized units (a'), from 2 to 20 mass % of polymerized units (b'), from 1 to 10 mass % of polymerized units (c') and from 0.2 to 5 mass % of polymerized units (d').

In the present invention, the contents of the respective polymerized units are values obtained from the charged amounts of the respective monomers on such a basis that the mass of polymerized units derived from the polymerization initiator and chain transfer agent in the fluorocopolymer (A) is regarded to be 0 (zero).

The fluorocopolymer (A) preferably has a mass average molecular weight (Mw) of from 5,000 to 100,000, more preferably from 20,000 to 90,000. When the mass average molecular weight is at least the lower limit within the above range, the water and oil resistance will be excellent, and when it is at most the upper limit, the film-forming property and the liquid stability will be excellent.

In this specification, the mass average molecular weight of the fluorocopolymer (A) is a molecular weight calculated as polymethyl methacrylate obtained by measurement by gel permeation chromatography using a calibration curve prepared by using a standard polymethyl methacrylate sample.

Process for Producing Fluorocopolymer

The fluorocopolymer (A) can be obtained by carrying out a polymerization reaction in a solvent by using a known method. Specifically, the fluorocopolymer (A) is obtained via a step of polymerizing in a solvent a monomer mixture comprising the above monomers (a), (b), (c) and, if necessary, the monomer (d) and another monomer. The polymerization may be solution polymerization or emulsion polymerization. However, solution polymerization is preferred from the viewpoint of the polymerization stability.

The solvent is not particularly limited, and for example, the following organic solvents may be employed. A ketone (such as acetone, methyl ethyl ketone or methyl isobutyl ketone), an alcohol (such as isopropyl alcohol), diacetone alcohol, an ester (such as ethyl acetate or butyl acetate), an ether (such as diisopropyl ether), an aliphatic hydrocarbon or aromatic hydrocarbon compound, a halogenated hydrocarbon (such as perchloroethylene, trichloro-1,1,1-ethane, trichlorotrifluoroethane or dichloropentafluoropropane), dimethylformamide, N-methyl-pyrrolidone-2, butyroacetone, dimethylsulfoxide (DMSO), glycol ether and its derivative, may, for example, be preferably employed.

In order to obtain a water and oil proofing composition (referred to also as an aqueous dispersion) having the fluorocopolymer (A) dispersed in an aqueous medium, it is preferred to employ an organic solvent having a relatively low boiling point or an organic solvent capable of forming an azeotropic composition with water, in the polymerization step, in consideration of the operation efficiency in the step after the polymerization reaction.

The organic solvent having a relatively low boiling point is preferably one having a boiling point at $1 \times 10^5$ Pa (hereinafter referred to simply as "boiling point") of at most 80° C., and it may, for example, be specifically acetone or methanol.

The above mentioned organic solvent capable of forming an azeotropic composition with water is preferably 2-propyl alcohol, methyl isobutyl ketone, methyl ethyl ketone or a mixed solvent thereof.

In the polymerization reaction to obtain the fluorocopolymer, the proportion (concentration) of the total amount of monomers is preferably from 5 to 60 mass %, more preferably from 10 to 40 mass, based on 100 mass % of the entire charged materials (including the polymerization solvent).

In the polymerization reaction to obtain the fluorocopolymer, it is preferred to employ a polymerization initiator. As the polymerization initiator, preferred may, for example, be ammonium persulfate; potassium persulfate; a peroxide such as benzyl peroxide, lauryl peroxide, succinyl peroxide or tert-butyl perpivalate; or an azo compound. The concentration of the polymerization initiator in the solvent is preferably from 0.1 to 1.5 parts by mass, per 100 parts by mass of the total amount of monomers.

An example of a preferred polymerization initiator may be ammonium persulfate, potassium persulfate, dimethyl-2,2'-azobis(2-methyl propionate), 2,2'-azobis(2-methylbutyronitrile), 4,4'-azobis(4-cyanovaleric acid), 2,2'-azobis(4-methoxy-2,4-dimethylvaleronitrile), 2,2'-azobis(2,4-dimethylvaleronitrile), 2,2'-azobis(2,4-dimethylvaleronitrile), 2,2'-azobis(2-methylbutyronitrile), 2,2'-azobis[2-(2-imidazoline-2-yl)propane], 2,2'-azobisisobutyronitrile, 1,1'-azobis(2-cyclohexane-1-carbonitrile), or 2,2'-azobis{2-methyl-N-[1,1-bis(hydroxymethyl)-2-hydroxyethyl]propionamide), and more preferred is, for example, ammonium persulfate, dimethyl-2,2'-azobis(2-methyl propionate) or 4,4'-azobis(4-cyanovaleric acid).

In order to adjust the polymerization degree (molecular weight) of the fluorocopolymer (A), it is preferred to employ a chain transfer agent in the polymerization reaction. As such a chain transfer agent, preferred may, for example, be an alkyl mercaptan (such as tert-dodecyl mercaptan, n-dodecyl mercaptan or stearyl mercaptan), aminoethanethiol, mercaptoethanol, thioglycolic acid, 2-mercaptopropionic acid or 2,4-diphenyl-4-methyl-1-pentene. The amount of the chain transfer agent is preferably from 0.05 to 1 part by mass per 100 parts by mass of the total amount of monomers in the polymerization reaction.

The reaction temperature in the polymerization reaction is preferably within a range of from room temperature to the boiling point of the reaction mixture, and with a view to efficiently utilizing the polymerization initiator, it is preferably at least the temperature for half life of the polymerization initiator, more preferably from 30 to 90° C.

After obtaining the copolymer by the polymerization reaction, it is preferred to carry out a salt-forming step of adding a base to form a salt with carboxylic acid groups in the copolymer. As such a base, it is possible to employ the same one as the above mentioned base to be used for forming a salt with carboxyl groups in the polymerized units (c'). When the carboxyl groups in the copolymer are in the form of a salt, the stability of the carboxyl groups will be improved, and the dispersibility of the fluorocopolymer (A) in the aqueous medium will be improved.

Water and Oil Proofing Composition

The fluorocopolymer (A) of the present invention is useful as a water and oil proofing agent to impart water and oil resistance to a substrate. At the time of applying the fluorocopolymer (A) to a substrate, it is preferably used in the form of a water and oil proofing composition comprising the fluorocopolymer (A) and an aqueous medium.

Namely, the water and oil proofing composition of the present invention comprises the fluorocopolymer (A) and an aqueous medium. It may further contain other additives.

The water and oil proofing composition of the present invention is preferably in the form of an aqueous dispersion comprising the fluorocopolymer (A) and an aqueous medium and having a content of a volatile organic solvent of at most 1 mass.

In the present invention, the volatile organic solvent means an organic solvent which volatilizes when stored at room temperature, and specifically, it is an organic solvent having a boiling point of at most 100° C. Here, a solvent which forms an azeotropic mixture with water is not included in such a volatile organic solvent.

The aqueous medium may be a liquid containing water and having a content of a volatile organic solvent being at most 1 mass, and specifically, it is preferably water or a azeotropic mixture containing water.

From the viewpoint of the handling efficiency, and health and safety, the aqueous medium is preferably water, or a mixture of water with at least one member selected from the group consisting of propylene glycol, propylene glycol monomethyl ether, dipropylene glycol monomethyl ether, dipropylene glycol, tripropylene glycol and diacetone alcohol.

The water and oil proofing composition in the form of an aqueous dispersion may be produced by adding an aqueous medium after the above described polymerization reaction to disperse the fluorocopolymer, and if necessary, by carrying out treatment to remove the organic solvent used for the polymerization.

The polymerization reaction is preferably carried out by a method of polymerizing the above mentioned monomer mixture in the above mentioned organic solvent having a boiling point of at most 80° C. or in an organic solvent forming an azeotropic composition with water.

In a case where the water and oil proofing composition contains the aqueous medium, it is preferred that some or all of carboxyl groups in the polymerized units (c') form the above mentioned salt. Accordingly, after the polymerization, the above mentioned base is added as the case requires, and the base is reacted with the carboxyl groups in the fluorocopolymer to carry out a salt-forming step of forming a salt. Then, the copolymer having carboxyl groups converted to a salt via the salt-forming step, is dispersed in the aqueous medium.

The aqueous medium and the base to convert carboxyl groups to a salt may be simultaneously added to disperse the fluorocopolymer in the aqueous medium while the reaction to form a salt (the salt-forming step) is permitted to proceed.

Thereafter, the organic solvent is removed, as the case requires. Removal of the organic solvent may be carried out, for example, by stripping (volatilization) treatment.

In the water and oil proofing composition in the form of an aqueous dispersion, the content of the volatile organic solvent may be at most 1 mass % and is most preferably zero.

In the water and oil proofing composition in the form of an aqueous dispersion, the average particle size of primary particles of the fluorocopolymer dispersed in water (A) is preferably at most 100 nm, more preferably at most 50 nm. When the particle size is at most 50 nm, when the water and oil proofing composition is to be applied to various substrates, a large amount of the fluorocopolymer (A) can be uniformly supported to the interior of the substrate, whereby the performance such as water and oil resistance can be improved, and an effect to improve the durability can be obtained. For example, it is effective in a case where water and oil proofing treatment of paper is carried out by an internal sizing method (method of mixing a water and oil proofing composition at the stage of pulp as the starting material for paper) or in a case where impregnation processing of leather is carried out.

The solid content concentration of the fluorocopolymer (A) in the water and oil proofing composition is preferably from 1 to 50 mass %, more preferably from 10 to 30 mass %.

Further, the solid content concentration at the time of actually applying the water and oil proofing composition to a substrate, may suitably be selected depending upon the substrate, the treating method, etc. For example, the solid content concentration is preferable from 0.005 to 10 mass %, more preferably from 0.01 to 5 mass.

The water and oil proofing composition may contain a binder, a resin, a crosslinking agent, a catalyst or the like in order to improve the adhesion to a substrate.

The paste may, for example, be hydroxyethylated starch, cationic starch, amphoteric starch, oxidized starch, phosphorylated starch or enzyme-modified starch.

The resin may, for example, be a polyvinyl alcohol, a polyvinyl chloride latex, a polyvinyl alcohol, a polyamideamine epichlorohydrin-modified resin or an N-vinylformaldehyde-vinylamine copolymer.

As the crosslinking agent, preferred may, for example, be a condensate or precondensate of urea or melamine-formaldehyde, methylol-dihydroxyethylene-urea or its derivative, a polyamideamine epichlorohydrin-modified resin, urone, methylol-ethylene-urea, methylol-propylene-urea, methylol-triazone, a dicyandiamide-formaldehyde condensate, methylol-carbamate, methylol-(meth)acrylamide or a polymer thereof.

As the catalyst, preferred may, for example, be ammonium chloride, an alkanolamine salt or a zirconium acetate salt.

Further, the water and oil proofing composition of the present invention may contain various additives. As such additives, preferred may, for example, be an organic or inorganic filler such as talc, kaolin, calcium carbonate or titanium dioxide; a supporting agent such as dextrine; a holding agent; a flocculant; a buffering agent; a bactericide; a biocide; a metal ion-sealing agent; a hydrophobizing agent such as ASA (alkenyl succinic anhydride) or AKD (alkyl ketene dimer).

Processed Article

The processed article of the present invention is one obtained by treating a substrate with the water and oil proofing composition.

The substrate is not particularly limited, and it may, for example, be paper, paper board, non-woven fabric, a carpet, artificial or synthetic leather, or natural leather.

Further, an inorganic or organic powder such as silica, alumina, talc, sericin or a resin powder, may be treated with the water and oil proofing composition, and using such a powder as a carrier medium, water and oil resistance may be imparted to another substrate.

The method for treating the substrate with the water and oil proofing composition is not particularly limited so long as it is a method capable of attaching the water and oil proofing composition to the substrate. For example, preferred is a method for coating or impregnating the substrate by spraying, brushing, padding, size press coating, metering size press coating, film press coating, gravure coating, flexo coating, roller coating, rotor dampening or foaming. After such coating or impregnation, drying is carried out at room temperature or a temperature higher than room temperature, and if necessary, heat treatment may be applied. By carrying out such drying, heat treatment, etc., it is possible to provide superior oil and water resistance.

Particularly, in a case where the water and oil proofing composition is used for treatment of e.g. paper, paper board or non-woven fabric, an internal sizing method may be employed wherein the water and oil proofing composition is applied directly to pulp or fiber, followed by forming into a sheet, or processing treatment may be carried out by a method so-called wet end or wet processing method.

Further, it is also possible to use internal sizing in pulp molding wherein a container made of paper is molded directly from a fiber material such as a pulp slurry.

When the water and oil proofing composition is used for internal sizing or wet end of paper or paper board, it is preferred to use a cationic resin or cationic starch as a fixing agent or a yield-improving agent.

As the cationic resin, it is possible to use at least one member selected from polydiallyldimethylammonium chloride, polyallylamine, polyvinylamine, polyethylene imine, polyamidepolyamine and its epichlorohydrin modified product, an acrylamide-allylamine copolymer, an acrylamide-dimethylaminoethyl (meth)acrylate copolymer, an acrylamide-diethylaminoethyl (meth)acrylate copolymer, an acrylamide-quaternary dimethylaminoethyl(meth)acrylate copolymer, an acrylamide-quaternary diethylaminoethyl (meth)acrylate copolymer, an N-vinylformaldehyde-vinylamine copolymer, etc.

The fluorocopolymer (A) of the present invention is a copolymer synthesized by combining a monomer (a) having a $C_{1-6}$ perfluoroalkyl group, the above mentioned monomer (b) and the above mentioned specific monomer (c) represented by $CH_2=C(COOH)-Q-COOH$, and as shown in Examples given hereinafter, by treating a substrate with a water and oil proofing composition of the present invention containing such a copolymer, it is possible to impart good water and oil resistance to the substrate even though the perfluoroalkyl group of the monomer (a) is a shorter chain than ever.

Especially, as compared with the case where no monomer (c) is employed (e.g. Preparation Example 14 and Production Example 14 given hereinafter), the water and oil resistance is improved, and thus, it is evident that the monomer (c) contributes the development of the water and oil resistance of the fluorocopolymer (A). The reason is not clearly understood, but one factor is considered to be such that the monomer (c) has dicarboxylic acid structures, and one of them is a highly reactive primary carboxyl group, whereby it is effectively adsorbed on a substrate having polar functional groups.

EXAMPLES

Now, the present invention will be described in further detail with reference to Examples. However, it should be understood that the present invention is by no means restricted to such Examples. In the following, "%" means "mass %" unless otherwise specified.

Performance evaluations were carried out by the following methods.

Oil Resistance: Kit Test

A kit test was carried out by the following method in accordance with TAPPI T559 cm-02 method. In the test, a kit solution prepared by mixing castor oil, toluene and n-heptane in a volume ratio as shown in Table 1, was used. The test result was represented by a kit number, and the larger the numerical value, the better the oil resistance.

By such a kit test, the trend of oil resistance of a test paper can be grasped in a very short time (in 15 seconds), and it is widely used for evaluation of the oil resistance. This evaluation result has a significance as an index for the surface tension of the paper surface.

Firstly, the test paper is placed on a clean, flat and black-colored surface, and one droplet of a mixed solution (kit solution) with kit number 12 was dropped on the test paper from a height of 13 mm. Fifteen seconds later (contact time: 15 seconds), the dropped mixed solution was wiped off with clean blotting paper, whereupon the paper surface which was in contact with the mixed solution was visually observed. If the color of the surface became dark, the same operation was carried out with a mixed solution with kit number 11, and the same operation was repeated sequentially reducing the kit number, until the color of the surface no longer became dark. The oil resistance is evaluated by the first (largest) kit number with which the color of the surface no longer becomes dark.

TABLE 1

| Kit number | Mixing ratio (vol %) | | |
| --- | --- | --- | --- |
| | Castor oil | Toluene | n-Heptane |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |

TABLE 1-continued

| Kit number | Mixing ratio (vol %) | | |
| --- | --- | --- | --- |
| | Castor oil | Toluene | n-Heptane |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |

Edible Oil Test

In order to carry out evaluation under more realistic practical conditions, resistance to various commercially available edible oils was evaluated.

A test paper of 3 cm×3 cm was folded along one diagonal line to make a crease and then folded along the other diagonal line to the opposite side to make the second crease. About 0.5 mL of edible oil was dropped to the intersection of the creases, and the test paper was put in an environmental tester and kept for one hour under two conditions i.e. at 40° C. under relative humidity of 10%, or at 40° C. under relative humidity of 80%. After the test paper was taken out of the environmental tester, the edible oil was wiped off from the test paper, and penetration of the edible oil into the test paper was visually observed.

Evaluation was made in such a three-grade scale that ○ indicates that no trace of penetration is observed, Δ indicates that scattered traces of penetration remain, and X indicates that penetration larger than the shape in contact with the edible oil remains.

As the edible oil, soybean oil (reagent, first grade, manufactured by JUNSEI CHEMICAL CO., LTD.), Resetta (tradename, manufactured by The Nisshin OilliO Group, Ltd.), and Econa (tradename, manufactured by Kao Corporation) were used.

Water Resistance: Ethanol and Water Resistance Test

In order to carry out evaluation of water resistance under more realistic practical conditions, an ethanol and water resistance test was carried out by the following method.

In accordance with the alcohol repellent test of WSP-80.8 (05), evaluation was carried out by using a mixed solution (test solution) prepared by mixing ethanol and water in a mixing ratio (mass %) as identified in Table 2. However, after dropping the droplet, the holding time (contact time) until the evaluation was 15 seconds in the same manner as in the kit test.

Firstly, test paper was placed on a clean flat transparent glass surface, and a test solution with Rating number 0 was placed on the test paper with a size having a diameter of about 5 mm by a pipette. Fifteen seconds later, the presence or absence of penetration was confirmed, and if no penetration was observed, a test solution droplet with the next larger Rating number was placed on the test paper in the same manner. This operation was repeated, and the largest Rating number where no penetration observed, was taken as the evaluation result.

According to this test, the resistance to water (Rating number 0) and to an ethanol aqueous solution (Rating numbers 1 to 10) can be evaluated. Ethanol more readily penetrates in paper than water. Thus, the larger the Rating number of the evaluation result, the better the water resistance. Further, the larger the Rating number of the evaluation result, the higher the resistance to foods containing various ethanols or to ethanol type antiseptic solutions.

TABLE 2

| Rating | Mixing ratio of ethanol/water (mass %) | |
|---|---|---|
| | Ethanol | Water |
| 0 | 0 | 100 |
| 1 | 10 | 90 |
| 2 | 20 | 80 |
| 3 | 30 | 70 |
| 4 | 40 | 60 |
| 5 | 50 | 50 |
| 6 | 60 | 40 |
| 7 | 70 | 30 |
| 8 | 80 | 20 |
| 9 | 90 | 10 |
| 10 | 100 | 0 |

Evaluation of Dispersion Stability

Stability of water dispersion (aqueous dispersion) of the fluorocopolymer was confirmed. Firstly, an aqueous dispersion prepared to have a solid content concentration of 20 mass % was put in a 110 ml sample bottle made of transparent glass and left to stand still at room temperature for three days, whereby presence or absence of sedimentation or agglomeration was visually confirmed. Evaluation was made on such basis that a case where no sedimentation or agglomeration was observed, was identified by ++, a case where sedimentation and agglomeration were slightly observed, was identified by +, and a case where substantial sedimentation and agglomeration were observed, was identified by −.

Preparation of Fluorocopolymers

In the following Preparation Examples 1 and 2, fluorocopolymers were prepared to have the blend compositions as identified in Table 3. The unit for the blend amounts shown in Table 3 is the proportion (parts by mass) per 100 parts by mass of the total amount of monomers.

Preparation Example 1

Into a glass ampoule container having a capacity of about 120 ml, 3,3,4,4,5,5,6,6,7,7,8,8,8-tridecafluorooctyl methacrylate (hereinafter referred to as C6FMA) (purity: 99.6%) as the monomer (a), 2-hydroxyethyl methacrylate (hereinafter referred to as HEMA) as the monomer (b) and itaconic acid (hereinafter referred to as IA) as the monomer (c) were charged in the blend ratio as identified in Table (total amount of monomers: 17.5 g), and at the same time, 52.5 g of acetone as a solvent and 1.8 g of dimethyl 2,2'-azobis(2-methyl propionate) (hereinafter referred to as AZMP) diluted with acetone to 10% as a polymerization initiator, were charged. Replacement with nitrogen was repeated three times, and the container was sealed with a rubber stopper. The container was set in a shaking constant temperature bath heated to a water temperature of 65° C., and polymerization was carried out for 24 hours by setting the number of shaking times to be 110 times per minute, to obtain a slightly yellow solution having a solid content concentration of 25% (an acetone solution of the copolymer). The molecular weight of the obtained fluorocopolymer was examined by gel permeation chromatography, whereby the mass average molecular weight (MW) was about 48,000.

Preparation Example 2

A fluorocopolymer was prepared in the same manner as in Preparation Example 1 except that in Preparation Example 1, the blend ratio of monomers was changed as identified in Table 3.

In Table 3, methacrylic acid (hereinafter referred to as MMA) was used as the monomer (d). The total amount of monomers used was 17.5 g. The molecular weight (MW) of the obtained fluorocopolymer was about 50,000.

TABLE 3

| | Preparation Example 1 | Preparation Example 2 |
|---|---|---|
| C6FMA (monomer a) | 77 | 77 |
| HEMA (monomer b) | 13 | 13 |
| IA (monomer c) | 10 | 2.5 |
| MAA (monomer d) | | 7.5 |
| AZMP (polymerization initiator) | 0.8 | 0.8 |
| Solvent for polymerization | Acetone | Acetone |
| MW of copolymer | 48,000 | 50,000 |

Preparation of Aqueous Dispersion Containing Fluorocopolymer

In the following Preparation Examples 11 to 14, fluorocopolymers were prepared in the blend ratios as shown in Table 4, and at the same time as reacting a base, an aqueous medium is added to prepare a water dispersion (aqueous dispersion) of the fluorocopolymer. The unit of the blend amounts shown in Table 4 is a proportion (parts by mass) per 100 parts by mass of the total amount of monomers.

Preparation Example 11

In the same manner as in Preparation Example 2, a fluorocopolymer was polymerized, and to 50 g of the obtained slightly yellow solution, 1.3 g of 2-amino-2-methyl-1-propanol (hereinafter referred to as AMP) as a base and 45 g of deionized water were added, emulsified and dispersed, and then, heated by means of an evaporator to distil off acetone under reduced pressure thereby to obtain a slightly orange transparent aqueous dispersion of a fluorocopolymer (content of a volatile organic solvent: at most 1 mass %). To this aqueous solution, deionized water was further added to obtain an aqueous dispersion (1) wherein the solid content concentration was 20 mass.

The dispersion stability of the obtained aqueous dispersion of the fluorocopolymer was evaluated by the above method. The results are shown in Table 4.

Preparation Example 12

An aqueous dispersion (2) having a solid content concentration of 20 mass % was obtained in the same manner as in Preparation Example 11 except that in Preparation Example 11, the base was changed to 1.3 g of diethanolamine (hereinafter referred to as DEA).

The dispersion stability of the obtained aqueous dispersion was evaluated by the above mentioned method. The results are shown in Table 4.

Preparation Example 13

An aqueous dispersion (3) having a solid content concentration of 20 mass % was obtained in the same manner as in Preparation Example 11 except that in Preparation Example 11, the composition of monomers was changed as shown in Table 4.

In this Example, as the monomer (b), HEMA and triethylene glycol dimethacrylate (TEDMA) were used in combination. The dispersion stability of the obtained aqueous dispersion was evaluated by the above mentioned method. The results are shown in Table 4.

Preparation Example 14

Comparative Example

An aqueous dispersion (4) having a solid content concentration of 20 mass % was obtained in the same manner as in Preparation Example 11 except that in Preparation Example 11, the composition of monomers was changed as shown in Table 4. In this Example, no monomer (c) was employed. The molecular weight (MW) of the fluorocopolymer was about 56,000.

The dispersion stability of the obtained aqueous dispersion was evaluated by the above described method. The results are shown in Table 4.

TABLE 4

|   | Preparation Example 11 Aqueous dispersion (1) | Preparation Example 12 Aqueous dispersion (2) | Preparation Example 13 Aqueous dispersion (3) | Preparation Example 14 Aqueous dispersion (4) |
|---|---|---|---|---|
| C6FMA (monomer a) | 77 | 77 | 77 | 77 |
| HEMA (monomer b) | 13 | 13 | 12 | 13 |
| TEDMA (monomer b) |  |  | 1 |  |
| IA (monomer c) | 2.5 | 2.5 | 2.5 |  |
| MAA (monomer d) | 7.5 | 7.5 | 7.5 | 10 |
| AZMP (polymerization initiator) | 0.8 | 0.8 | 0.8 | 0.8 |
| Solvent for polymerization | Acetone | Acetone | Acetone | Acetone |
| Base | AMP | DEA | AMP | AMP |
| Dispersion stability | ++ | + | ++ | ++ |

TABLE 5

|  | Production Example 1 Water and oil proofing agent Preparation Example 1 | | | Production Example 2 Water and oil proofing agent Preparation Example 2 | | |
|---|---|---|---|---|---|---|
| Paper | A | B | C | A | B | C |
| Kit test | 9 | 10 | 10 | 8 | 9 | 9 |
| Ethanol and water resistance test | 7 | 8 | 5 | 6 | 7 | 5 |

Production Examples 1 and 2

Impregnation Processing of Paper

Using the fluorocopolymer obtained in each of Preparation Examples 1 and 2 as a water and oil proofing agent, a water and oil proofing paper (processed paper) was produced by impregnation processing.

Namely, the acetone solution of the fluorocopolymer obtained in each of Preparation Examples 1 and 2 was diluted with ASAHIKLIN AK-225G (tradename, manufactured by Asahi Glass Company, Limited) being a solvent for a fluorinated polymer, so that the solid content concentration would be 0.5 mass %, to prepare a water and oil proofing composition.

As substrates, unsized paper grammage 40 g/m² (hereinafter referred to as paper A) and unsized paper grammage 75 g/m² (hereinafter referred to as paper B), each made of bleached hardwood kraft pulp and bleached softwood kraft pulp in a mixed ratio of 7:3 as dried, and filter paper 4A manufactured by ADVANTEC (grammage 95 g/m², hereinafter referred to as paper C) were prepared. Each paper (substrate) was impregnated in the water and oil proofing composition for 5 seconds and then hanged in a draft at room temperature for 6 hours to evaporate the solvent, followed by drying at 100° C. for 60 seconds by means of a cylinder dryer, to obtain base paper for tests.

Using the obtained base paper as test paper, the above mentioned kit test and ethanol and water resistance test were carried out. The evaluation results are shown in Table 5.

Production Examples 11 to 13

Internal Sizing of Paper

Using the aqueous dispersion of the fluorocopolymer obtained in each of Preparation Examples 11 to 13 as a water and oil proofing composition, water and oil proofing paper (processed paper) was produced by internal sizing.

As a raw material pulp, one obtained by beating a mixed pulp of bleached softwood kraft pulp and bleached hardwood kraft pulp (one having a mass ratio of 7:3 as dried) by TAPPI standard niagara test beater of JIS P 8221-1 to a freeness of 450 by Canadian standard freeness of JIS P 8121, was used.

Such pulp was disintegrated by means of TAPPI standard pulp disintegrator as disclosed in JIS P 8220 at a pulp concentration of 1.2 mass, and then, to the obtained pulp slurry, an N-vinylformamide-vinylamine copolymer (tradename: Catiofast VMP, manufactured by BASF Japan Ltd., hereinafter referred to as VMP) was added as a fixing agent, and then the aqueous dispersion of the fluorocopolymer was added.

The amount of the fixing agent (VMP) and the amount of the aqueous dispersion are as shown in Table 6. The amount in Table 6 is the proportion (unit: mass) of the additive (solid content) based on 100 mass % of the mass as dried, of the entire pulp in the pulp slurry.

Here, the N-vinylformamide-vinylamine copolymer is known as a fixing agent to fix an anionic compound to pulp (e.g. JP-A-2005-42271).

Using the pulp slurry thus obtained, paper grammage 40 g/m² or 60 g/m² was made by hand by means of TAPPI standard sheeting machine disclosed in JIS P 8222, and further dried at 100° C. for 60 seconds by means of a cylinder dryer to obtain base paper for tests.

Using the base paper thus obtained as test paper, the above mentioned kit test, ethanol and water resistance test and edible oil test were carried out. The evaluation results are shown in Table 6.

Production Example 14

Internal Sizing of Paper

Water and oil proofing paper was produced and evaluated in the same manner as in Production Example 11 except that the aqueous dispersion (4) of the fluorocopolymer obtained in Preparation Example 14 was used as a water and oil proofing composition. The evaluation results are shown in Table 7.

Production Example 15

Internal Sizing of Paper

Water and oil proofing paper was produced and evaluated in the same manner as in Production Example 11 except that in Production Example 11, a commercially available fluorinated oil-proofing agent having a long chain per fluoroalkyl group was used instead of the aqueous dispersion of the fluorocopolymer obtained in Preparation Example 11. The evaluation results are shown in Table 7. As the fluorinated oil-proofing agent, ASAHI GUARD AG-530 (tradename, a diethanolamine salt of perfluoroalkylethyl phosphoric acid ester, the chain length of the perfluoroalkyl group being at least 8, and the average chain length being about 9, manufactured by Asahi Glass Company, Limited, solid content in the product: 15%) was used.

Production Example 16

Internal Sizing of Paper

Instead of the fluorocopolymer, a phosphoric acid ester having a $C_6$ perfluoroalkyl group and forming a diethanolamine salt, was used.

Namely, an aqueous dispersion (hereinafter referred to as C6P) of a compound being a diethanolamine salt of a perfluoroalkylethyl phosphoric acid ester represented by $(C_6F_{13}CH_2CH_2O)_k P(=O)(ON(C_2H_5OH)_2)_{3-k}$ (wherein k=1.6) and having a chain length of the perfluoroalkyl group being 6, was prepared and subjected to evaluation.

Water and oil proofing paper was produced and evaluated in the same manner as in Production Example 11 except that in Production Example 11, C6P prepared as described above, was used instead of the aqueous dispersion of the fluorocopolymer obtained in Preparation Example 11. The evaluation results are shown in Table 7.

Production Example 17

Internal Sizing of Paper

Water and oil proofing paper was produced and evaluated in the same manner as in Production Example 11 except that in Production Example 11, a commercially available fluorinated oil proofing agent containing no long chain perfluoroalkyl group was used instead of the aqueous dispersion of the fluorocopolymer obtained in Preparation Example 11. The evaluation results are shown in Table 7.

As the fluorinated oil proofing agent, Solvera PT5060 (tradename, a product which is a fluorinated oil proofing agent made of a reaction product of a diol of perfluoropolyether with isophorone diisocyanate and which contains no long chain perfluoroalkyl group; manufactured by Solvay Solexis, solid content in the product: 25%) was used.

TABLE 6

|  | Production Example 11 | | Production Example 12 | | Production Example 13 | |
|---|---|---|---|---|---|---|
| VMP | 0.1% | | 0.1% | | 0.1% | |
| Aqueous dispersion (1) | 0.5% | | | | | |
| Aqueous dispersion (2) | | | 0.5% | | | |
| Aqueous dispersion (3) | | | | | 0.5% | |
| Paper grammage | 40 g/m² | 60 g/m² | 40 g/m² | 60 g/m² | 40 g/m² | 60 g/m² |
| Kit test | 4 | 7 | 4 | 4 | 7 | 7 |
| Ethanol and water resistance test | 4 | 8 | 4 | 4 | 8 | 8 |
| Edible oil test 40° C., 10% RH, 1 hr | | | | | | |
| Soybean oil | ○ | ○ | ○ | ○ | ○ | ○ |
| Resetta | Δ | ○ | Δ | ○ | Δ | ○ |
| Econa | ○ | ○ | Δ | ○ | ○ | ○ |
| Edible oil test 40° C., 80% RH, 1 hr | | | | | | |
| Soybean | ○ | ○ | ○ | ○ | ○ | ○ |
| Resetta | Δ | ○ | Δ | ○ | Δ | ○ |
| Econa | ○ | ○ | Δ | ○ | ○ | ○ |

TABLE 7

|  | Production Example 14 | | Production Example 15 | | Production Example 16 | | Production Example 17 | |
|---|---|---|---|---|---|---|---|---|
| VMP | 0.1% | | 0.1% | | 0.1% | | 0.1% | |
| Aqueous dispersion (4) | 0.5% | | | | | | | |
| AG-530 | | | 0.5% | | | | | |
| C6P | | | | | 0.5% | | | |
| PT5060 | | | | | | | 0.50% | |
| Paper grammage | 40 g/m² | 60 g/m² | 40 g/m² | 60 g/m² | 40 g/m² | 60 g/m² | 40 g/m² | 60 g/m² |
| Kit test | 3 | 5 | 10 | 12 | 7 | 10 | 4 | 6 |
| Ethanol and water resistance test | 1 | 5 | 3 | 7 | 0 | 0 | 0 | 0 |
| Edible oil test 40° C., 10% RH, 1 hr | | | | | | | | |
| Soybean oil | ○ | ○ | ○ | ○ | ○ | ○ | ○ | ○ |
| Resetta | Δ | Δ | Δ | ○ | X | ○ | Δ | ○ |
| Econa | Δ | ○ | Δ | ○ | X | X | ○ | ○ |

TABLE 7-continued

|  | Production Example 14 | | Production Example 15 | | Production Example 16 | | Production Example 17 | |
| --- | --- | --- | --- | --- | --- | --- | --- | --- |
| Edible oil test 40° C., 80% RH, 1 hr | | | | | | | | |
| Soybean | ○ | ○ | ○ | ○ | Δ | ○ | X | Δ |
| Resetta | Δ | ○ | Δ | ○ | X | X | X | X |
| Econa | X | Δ | Δ | ○ | X | X | X | X |

The results in Table 5 show that processed paper sheets (Production Examples 1 and 2) treated with the fluorocopolymers obtained in Preparation Examples 1 and 2 are excellent in water resistance, ethanol resistance and oil resistance.

The results in Table 6 show that processed paper sheets (Production Examples 11 to 13) treated with the aqueous dispersions of the fluorocopolymers obtained in Preparation Examples 11 to 13 have good water resistance, ethanol resistance and oil resistance. Further, as compared with Production Example 15 in Table 7 employing a conventional fluorinated oil proofing agent having a long chain perfluoroalkyl group, in Production Examples 11 to 13, substantially equal results were obtained in the ethanol and water resistance test and edible oil test although the results were poor in the kit test.

Further, as shown in Table 4, the aqueous dispersions of the fluorocopolymers obtained in Preparation Examples 11 to 13 were good in the dispersion stability.

On the other hand, as shown by the results in Table 7, in Production Example 14 wherein the fluorocopolymer has no monomer (c), the water and oil resistance is poor.

Further, in Production Examples 16 and 17, evaluation in the ethanol and water resistance is 0, and evaluation in the edible oil test, X is many, thus indicating poor water and oil resistance.

INDUSTRIAL APPLICABILITY

The fluorocopolymer of the present invention is capable of imparting excellent water and oil resistance to a substrate. A substrate treated with the fluorocopolymer of the present invention is excellent in a barrier property such as water and oil resistance.

Paper, nonwoven fabric, etc. treated with the fluorocopolymer of the present invention may be used for various packaging materials, covering materials, sound-absorbing materials, filters, filtering materials, etc. Further, the fluorocopolymer of the present invention is capable of imparting excellent water and oil resistance to e.g. fibers, textiles, leather, fur, etc.

Further, the fluorocopolymer of the present invention is capable of imparting excellent water and oil resistance to inorganic and organic powders such as silica, alumina, talc, sericin and resin powders, and such powders are useful for application to cosmetics, etc. Further, such powders may be used as supporting media to impart water resistance or oil resistance to other substrates. Thus, it is industrially very useful.

The entire disclosure of Japanese Patent Application No. 2007-285128 filed on Nov. 1, 2007 including specification, claims and summary is incorporated herein by reference in its entirety.

What is claimed is:

1. A water and oil proofing composition comprising a fluorocopolymer comprising from 40 to 98 mass % of polymerized units (a') based on the following monomer (a), from 1 to 50 mass % of polymerized units (b') based on the following monomer (b) and from 1 to 10 mass % of polymerized units (c') based on the following monomer (c):

monomer (a): a compound represented by $(Z-Y)_nX$, wherein Z is a $C_{1-6}$ perfluoroalkyl group or a monovalent group represented by $C_mF_{2m+1}O(CFWCF_2O)_dCFK-$, wherein m is an integer of from 1 to 6, d is an integer of from 1 to 4, and each of W and K which are independent of each other, is a fluorine atom or a trifluoromethyl group, Y is a single bond or a bivalent organic group containing no fluorine atom, n is 1 or 2, provided that when n is 1, X is $-CR=CH_2$, $-COOCR=CH_2$, $-COOCR=CH_2$, $-OCH_2-\phi-CR=CH_2$ or $-OCH=CH_2$, and when n is 2, X is $-CH(-(CH_2)_pCR=CH_2)-$, $-CH(-(CH_2)_pCOOCR=CH_2)-$, $-CH(-(CH_2)_pOCOCR=CH_2)-$ or $-OCOCH=CHCOO-$, R is a hydrogen atom, a methyl group or a halogen atom, $\phi$ is a phenylene group, p is an integer of from 0 to 4, and when n is 2, two (Z—Y) present in one molecule may be the same or different from each other;

monomer (b): a compound represented by $CH_2=CR^1-G-(R^2O)_q-R^3$, wherein $R^1$ is a hydrogen atom or a methyl group, $R^2$ is a $C_{2-4}$ alkylene group, or a $C_{2-3}$ alkylene group having some or all of its hydrogen atoms substituted by hydroxyl groups, q is an integer of from 1 to 10, G is $-COO(CH_2)_r-$ or $-COO(CH_2)_t-NHCOO-$, wherein r is an integer of from 0 to 4, and t is an integer of from 1 to 4, and $R^3$ is a hydrogen atom, a methyl group, an acryloyl group, a methacryloyl group or an allyl group;

monomer (c): a compound represented by $CH_2=C(COOH)-Q-COOH$, wherein Q is a $C_{1-4}$ alkylene group, or a $C_{2-3}$ alkylene group having some or all of its hydrogen atoms substituted by hydroxyl groups, and an aqueous medium wherein the content of a volatile organic solvent in the aqueous medium is not more than 1 mass %, and in the polymerized units (c'), some or all of carboxyl groups form at least one salt selected from the group consisting of an alkali metal salt, an ammonium salt and an organic amine salt.

2. The water and oil proofing composition according to claim 1, wherein said fluorocopolymer further comprises from 0.1 to 10 mass % of polymerized units (d') of the following monomer (d):

monomer (d): a monomer which is copolymerizable with the above monomers (a), (b) and (c) and is not included in any of the monomers (a), (b) and (c) and which has at least one functional group selected from the group consisting of a carboxyl group, an isocyanate group, a blocked isocyanate group, a urethane group, an alkoxysilyl group, an epoxy group, an N-methylol group and an N-alkoxymethyl group and has no polyfluoroalkyl group.

3. The water and oil proofing composition according to claim 1, wherein Z is a $C_{1-6}$ perfluoroalkyl group, Y is a bivalent organic group containing no fluorine atom, n is 1 and X is —OCOCR=$CH_2$, or n is 2 and X is
—OCOCH=CHCOO—, wherein R is a hydrogen atom, a methyl group or a halogen atom.

4. The water and oil proofing composition according to claim 3, wherein the monomer (a) is a compound represented by $F(CF_2)_sY^1OCOCR$=$CH_2$, wherein s is an integer of from 1 to 6, R is a hydrogen atom, a methyl group or a halogen atom, and $Y^1$ is a $C_{1-10}$ alkylene group.

5. The water and oil proofing composition according to claim 1, wherein G is —COO$(CH_2)_r$—, wherein r is an integer of from 0 to 4, $R^2$ is a $C_{2-4}$ alkylene group, q is an integer of from 1 to 10, and $R^3$ is a hydrogen atom.

6. The water and oil proofing composition according to claim 5, wherein the polymerized units (b') are polymerized units based on 2-hydroxyethyl methacrylate.

7. The water and oil proofing composition according to claim 1, wherein the polymerized units (c') are polymerized units based on itaconic acid, some or all of carboxyl groups may form at least one salt selected from the group consisting of an ammonium salt and an organic amine salt.

8. The water and oil proofing composition according to claim 1, wherein said fluorocopolymer, has a mass average molecular weight of from 5,000 to 100,000.

9. The water and oil proofing composition according to claim 1, wherein some or all of carboxyl groups in the polymerized units (c') form salts with at least one member selected from the group consisting of ammonia, diethanolamine, tris (hydroxymethyl)aminomethane and 2-amino-2-methyl-1-propanol.

10. A processed article treated with the water and oil proofing composition as defined in claim 1.

11. The water and oil proofing composition of claim 1, wherein said fluorocopolymer is produced by a process comprising a step of polymerizing a monomer mixture comprising from 40 to 98 mass % of the following monomer (a), from 1 to 50 mass % of the following monomer (b) and from 1 to 10 mass % of the following monomer (c):

monomer (a): a compound represented by $(Z—Y)_nX$, wherein Z is a $C_{1-6}$ perfluoroalkyl group or a monovalent group represented by $C_mF_{2m+1}O(CFWCF_2O)_dCFK$—, wherein m is an integer of from 1 to 6, d is an integer of from 1 to 4, and each of W and K which are independent of each other, is a fluorine atom or a trifluoromethyl group, Y is a single bond or a bivalent organic group containing no fluorine atom, n is 1 or 2, provided that when n is 1, X is —CR=$CH_2$, —COOCR=$CH_2$, —OCOCR=$CH_2$, —OCH$_2$-φ-CR=$CH_2$ or —OCH=$CH_2$, and when n is 2, X is —CH(—$(CH_2)_p$CR=$CH_2$)—, —CH(—$(CH_2)_p$COOCR=$CH_2$)—, —CH(—$(CH_2)_p$OCOCR=$CH_2$) or —OCOCH=CHCOO—, R is a hydrogen atom, a methyl group or a halogen atom, φ is a phenylene group, p is an integer of from 0 to 4, and when n is 2, two (Z—Y) present in one molecule may be the same or different from each other;

monomer (b): a compound represented by $CH_2$=$CR^1$-G-$(R^2O)_q$-$R^3$, wherein $R^1$ is a hydrogen atom or a methyl group, $R^2$ is a $C_{2-4}$ alkylene group, or a $C_{2-3}$ alkylene group having some or all of its hydrogen atoms substituted by hydroxyl groups, q is an integer of from 1 to 10, G is
—COO$(CH_2)_r$— or —COO$(CH_2)_t$—NHCOO—, wherein r is an integer of from 0 to 4, and t is an integer of from 1 to 4, and $R^3$ is a hydrogen atom, a methyl group, an acryloyl group, a methacryloyl group or an allyl group;

monomer (c): $CH_2$=C(COOH)-Q-COOH, wherein Q is a $C_{1-4}$ alkylene group, or a $C_{2-3}$ alkylene group having some or all of its hydrogen atoms substituted by hydroxyl groups, and in the monomer (c).

12. The water and oil proofing composition according to claim 11, wherein the monomer mixture further comprises from 0.1 to 10 mass % of the following monomer (d):

monomer (d): a monomer which is copolymerizable with the above monomers (a), (b) and (c) and is not included in any of the monomers (a), (b) and (c) and which has at least one functional group selected from the group consisting of an isocyanate group, a blocked isocyanate group, a urethane group, an alkoxysilyl group, an epoxy group, an N-methylol group and an N-alkoxymethyl group and has no polyfluoroalkyl group.

13. A process for producing a water and oil proofing composition, which comprises a salt-forming step of reacting the fluorocopolymer obtained by the process as defined in claim 12 with at least one member selected from the group consisting of ammonia, diethanolamine, tris(hydroxymethyl)aminomethane and 2-amino-2-methyl-1-propanol to convert some or all of carboxyl groups of the fluorocopolymer to a salt or salts, and a step of dispersing the fluorocopolymer after the salt-forming step in an aqueous medium.

14. The water and oil proofing composition according to claim 1, wherein said composition is in the form of an aqueous dispersion.

15. The water and oil proofing composition according to claim 1, wherein said volatile organic solvent has a boiling point of at most 100° C.

16. The water and oil proofing composition according to claim 1, wherein said aqueous medium comprises water and at least one member selected from the group consisting of propylene glycol, propylene glycol monomethyl ether, dipropylene glycol monomethylether, dipropylene glycol, tripropylene glycol and diacetone alcohol.

17. The water and oil proofing composition according to claim 1, wherein said composition comprises 1 to 50 mass % of said fluorocopolymer (A).

18. The water and oil proofing composition according to claim 1, wherein said composition comprises 10 to 30 mass % of said fluorocopolymer (A).

19. The water and oil proofing composition according to claim 1, wherein monomer (b) comprise 2-hydroxyethyl methacrylate.

* * * * *